C. G. FITCH.
FLUID BEATER.
APPLICATION FILED FEB. 15, 1911.
1,025,798.
Patented May 7, 1912.
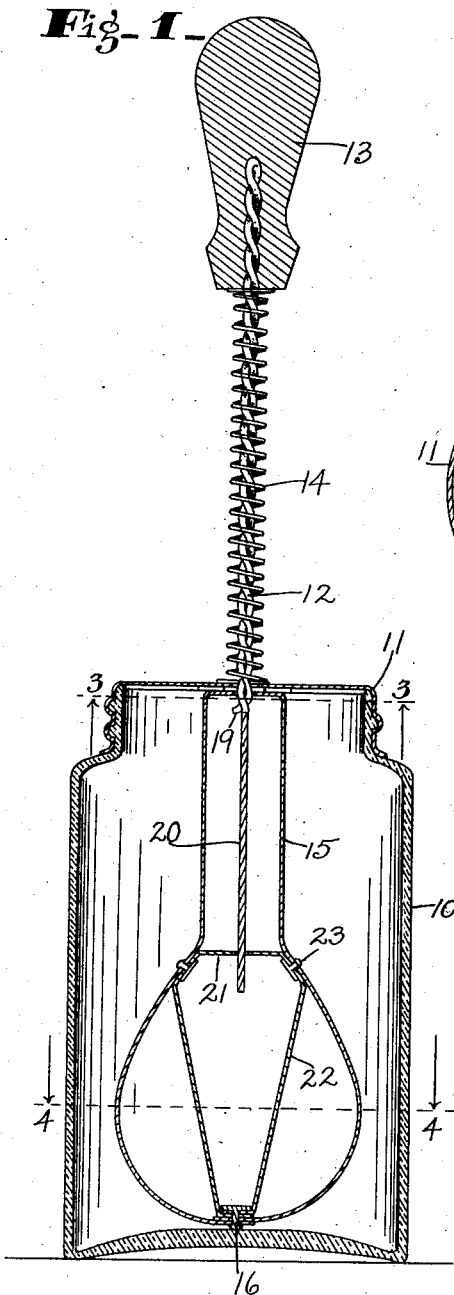
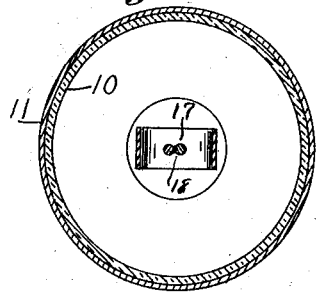
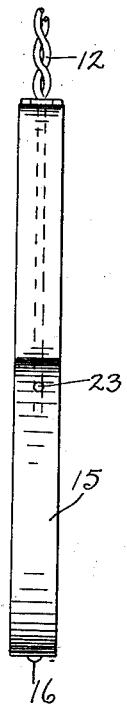
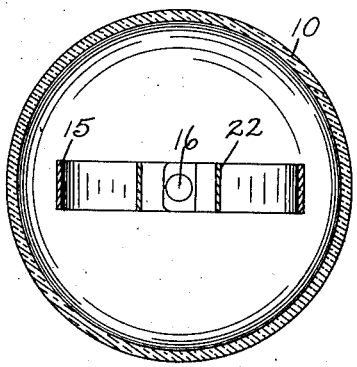
WITNESSES:
INVENTOR.
Charles. G. Fitch.
BY
ATTORNEY.

UNITED STATES PATENT OFFICE.

CHARLES G. FITCH, OF INDIANAPOLIS, INDIANA.

FLUID-BEATER.

1,025,798.  Specification of Letters Patent.  Patented May 7, 1912.

Application filed February 15, 1911. Serial No. 608,812.

*To all whom it may concern:*

Be it known that I, CHARLES G. FITCH, a citizen of the United States, and a resident of Indianapolis, county of Marion, and State of Indiana, have invented a certain useful Fluid-Beater; and I do hereby declare that the following is a full, clear, and exact description thereof, reference being had to the accompanying drawings.

The object of this invention is to improve egg beaters and is particularly an improvement on the one-hand egg beater shown in Letters Patent to Emmett R. Roberts, No. 692,479, patented February 4, 1902, and controlled by applicant.

The nature of the invention will be understood from the accompanying drawings and the following description and claim.

In the drawings Figure 1 is a central vertical section through the device. Fig. 2 is a side elevation of the looped part of the beater proper. Fig. 3 is a section on the line 3—3 of Fig. 1. Fig. 4 is a section on the line 4—4 of Fig. 1.

10 represents a glass fruit jar with a threaded upper end which is adapted to be closed by a threaded metal cap 11. In the center of this metal cap a hole is provided through which an actuator bar 12 extends. This actuator has a handle 13 secured to its upper end and a spiral spring 14 surrounds said bar between the handle and the cap of the fruit jar. The actuator bar is formed by twisting a pair of wires so that the bar as a whole is provided with spiral ribs.

Within the fruit jar a revoluble beater frame is located consisting of a metal bar or narrow plate 15 which is looped and extends from the top of the jar to the bottom and is wider throughout the lower half and at the bottom has a bearing pin 16 to rest upon the bottom of the fruit jar and enable the beater to turn freely. This bearing pin is in the nature of a rivet and is used also to secure the ends of the metal bar 15 together. The upper end of said beater frame 15 is horizontal and has in it a pair of holes 17 merging into each other somewhat so that between the two holes there are two oppositely located rods 18 projecting toward each other. The twisted portion of the actuator bar 12 which extends through the cap of the fruit jar also extends through these holes 17 and one strand of the wire is cut off just below the hole 17 and bent to form the strip 19 which prevents the actuator bar from escaping from the beater. The other strand is extended to form the extension 20 which extends down about half way to the bottom of the beater frame 15 and extends through a hole in the transverse bar 21. This holds the actuator bar 12 in a vertical position. This cross bar 21, however, is preferably integral and constitutes part of the interior beater frame 22 which at its upper ends is riveted at two points to the frame 15 by the rivets 23 and its lower ends are secured together by the rivet 16. Hence, this beater frame 22 is located within the lower enlarged portion of the beater frame 15 and is wider at the top and tapers at the bottom, being thus formed substantially oppositely to the enlarged portion of the beater 15 so as to materially contribute to the effectiveness of the device in operation. This makes a very convenient device for the housekeeper, as it can be operated by one hand entirely and it is associated with a jar or container and coöperates therewith in the beating position.

I claim as my invention:

The combination with a fluid beater, a closed retainer, a metallic beater frame with the upper sides thereof substantially parallel and the lower portions thereof curved substantially ovally, and means for rotating said frame, of a bar secured to the frame at substantially the junction of said parallel and said oval portions and extending directly downward and inwardly and with the ends thereof secured to the bottom of said oval portion, whereby said oval portion will not be distorted by a direct downward pressure or by centrifugal force.

In witness whereof, I have hereunto affixed my signature in the presence of the witnesses herein named.

CHARLES G. FITCH.

Witnesses:
A. M. FITCH,
H. J. WELLS.

Copies of this patent may be obtained for five cents each, by addressing the "Commissioner of Patents, Washington, D. C."